(12) United States Patent
Franco et al.

(10) Patent No.: US 9,656,120 B1
(45) Date of Patent: May 23, 2017

(54) FITNESS LEVEL

(71) Applicants: Jorge Romero Franco, Millbrae, CA (US); Maria Franco, Millbrae, CA (US); Jorge Marcel Franco, Millbrae, CA (US); Danielle Franco, Millbrae, CA (US)

(72) Inventors: Jorge Romero Franco, Millbrae, CA (US); Maria Franco, Millbrae, CA (US); Jorge Marcel Franco, Millbrae, CA (US); Danielle Franco, Millbrae, CA (US)

( * ) Notice: Subject to any disclaimer, the term of this patent is extended or adjusted under 35 U.S.C. 154(b) by 0 days.

(21) Appl. No.: 15/167,405

(22) Filed: May 27, 2016

Related U.S. Application Data

(60) Provisional application No. 62/286,118, filed on Jan. 22, 2016.

(51) Int. Cl.
*A63B 24/00* (2006.01)
*A63B 21/072* (2006.01)
*G09B 5/06* (2006.01)

(52) U.S. Cl.
CPC ...... *A63B 24/0003* (2013.01); *A63B 24/0062* (2013.01); *G09B 5/06* (2013.01); *A63B 21/072* (2013.01); *A63B 2220/833* (2013.01)

(58) Field of Classification Search
CPC ............ A63B 24/0003; A63B 24/0062; A63B 2220/833; A63B 21/072; G09B 5/06
USPC ....................................................... 482/1, 8
See application file for complete search history.

(56) References Cited

U.S. PATENT DOCUMENTS

| | | | |
|---|---|---|---|
| 4,077,132 A | 3/1978 | Erickson | |
| 4,593,475 A | 6/1986 | Mayes | |
| 4,888,875 A | 12/1989 | Strothers | |
| 5,430,435 A * | 7/1995 | Hoch | A61B 5/1121 273/DIG. 17 |
| 5,592,745 A * | 1/1997 | Heger | G01C 9/06 33/343 |
| 5,956,260 A * | 9/1999 | Heger | G01C 9/06 33/391 |
| 7,610,689 B1 | 11/2009 | Zhang | |
| 8,189,058 B2 * | 5/2012 | Molgaard | G03B 17/00 348/208.3 |
| 8,602,945 B1 * | 12/2013 | Haubrich | A63B 71/0622 482/1 |
| 2014/0073496 A1 * | 3/2014 | Bannerman | A63B 21/0552 482/139 |
| 2014/0101950 A1 | 4/2014 | Zhuang | |
| 2015/0355786 A1 * | 12/2015 | Sabatelli | G06F 3/0481 715/798 |

OTHER PUBLICATIONS

UniqueApps, "iHandy Level iPhone App Review", Jan. 19, 2009, the entire video (3:16 mins), https://www.youtube.com/watch?v=g47zdo_aDOI.*

Moz, "How to Turn Your iPhone Into a Spirit Level", Jan. 30, 2014, The entire video (00:44 seconds), https://www.youtube.com/watch?v=-4rFxN7FSP4.*

* cited by examiner

*Primary Examiner* — Sundhara Ganesan

(57) ABSTRACT

A level for attaching to a weight lifting bar includes sensors for detecting the level of the bar and visual and audio alerts for notifying a user whether the weight lifting bar is balanced or unbalanced. Information provided by the sensors can be recorded and stored for analysis.

26 Claims, 3 Drawing Sheets

FITNESS LEVEL

This application claims the benefit under 35 U.S.C §119 (e) of U.S. Provisional Application No. 62/286,118 filed on Jan. 22, 2016, which is incorporated by reference in its entirety.

FIELD

Levels for attaching to an apparatus include sensors for detecting the level of the bar and visual and audio alerts for notifying a user whether the apparatus is balanced or unbalanced. Information provided by the sensors can be recorded and stored for analysis.

BACKGROUND

Mechanical level sensors such as spirit levels are well known and can be adapted for use in determining the tilt of exercise equipment. For example, a spirit level can be attached to the center of a fitness or weightlifting bar. While appropriate for certain types of exercise such as when performing a bench press, where the spirit level is visible to the user throughout the exercise routine, in other exercise the fitness or weightlifting bar is not always or never visible. For example, some exercises involve the user lifting a barbell over head or placing a barbell on the shoulders. In such circumstances a spirit level is inappropriate because it is not visible to the user during all or part of the exercise routine and therefore cannot provide instantaneous feedback about the tilt of the exercise equipment.

Oftentimes people who are weightlifting will have uneven muscle mass, which can result in lifting weights unevenly. As a result, working out in this way over time will potentially harm and damage joints, muscles, and/or bones. Exercising in an unbalanced form can ultimately lead to physical injuries or compromise the benefits of exercising.

People have a tendency to preform repetitious motion in an unbalanced form while weightlifting. It is known that the perception of balance can differ among people. For example, something that seems level to one person may appear tilted to another person. Also, when doing repetitive activities such as weightlifting distractions such as other people, objects, noises, and/or fatigue can affect performance and perception. Sports and recreational activities that need to have proper alignment and limited mobility should be performed correctly to prevent physical injury and to maximize the benefits. Motions that are exerted during physical activities that should be performed at a leveled (even, steady, repetitious consistent) form can cause physical injury if not done properly. In physical proper form can minimize the potential for further injury and can maximize the benefits of the therapy.

Exercises using weights are often used in training and in physical therapy. Weightlifting equipment can include barbells in which removable weights can be attached on opposite sides of an elongated rod. Various exercises can be performed using the barbell. While performing an exercise, the barbell may tilt with respect to vertical thereby exerting more force on one side of a user's body. Barbell exercises are more safely and effectively performed when the barbell remains level throughout the exercise regimen and during each repetition of the particular exercise. For example, when bench pressing weights, it is desirable that the bar remain level as the bar is pushed away from and then toward a user's chest in a continuous motion during a repetition. By knowing the degree of tilt during the exercise a user can adjust the tilt during the repetition.

Some exercises may require faster motion than others and/or some users may perform an exercise at a faster rate. Instantaneous tilt monitoring allows a user to adjust alignment during each repetition of an exercise routine and thereby perform each repetition in a safe and efficient manner.

Apparatus for monitoring the levelness of exercise equipment are disclosed in U.S. Pat. No. 4,888,875 to Strother. The apparatus disclosed by Strother include a spirit level in which a bubble or ball moves within a fluid to indicate the degree of levelness. These levels can be difficult to read and to control in a dynamic environment such as when using exercise equipment and are better suited to static environments such as in construction. For example, when using a weightlifting bar the degree of levelness can change rapidly as the bar tilts to the left or to the right during a single repetition. The motion of a bubble or ball within a fluid can either be too rapid or too slow to effectively capture the degree of levelness and accurately communicate the levelness to the user in a meaningful way to facilitate the user's ability to adjust the levelness during an exercise repetition. Spirit levels are impractical for use in a dynamic environment where the title angle can change rapidly and a user requires immediate feedback to bring the equipment level. Another disadvantage of spirit levels is that they are basically binary devices, meaning that when the spirit level is titled the bubble or ball will move to the extreme right or to the extreme left of the fluid tube at a rate determined by the degree of tilt, and will be centered in the fluid tube when the apparatus is level. In a dynamic environment, it is useful to have an immediate measurement and readout of the degree of tilt, not simply whether the apparatus is level or not level. By knowing the degree or extent of tilt, a user is more able to actively adjust to maintain the levelness of an apparatus. A small degree of tilt requires a small exertion of effort to correct the tilt and bring the exercise equipment to level, while a large degree of tilt requires a large exertion of effort to correct the tilt and bring the exercise equipment to level.

Apparatus for dynamically monitoring the level of exercise equipment such as a weightlifting bar and informing the user of the degree of levelness are desired.

SUMMARY

In a first aspect of the invention, a fitness level comprises a housing; an electronic level sensor disposed within the housing; and an output device retained by the housing, wherein the output device is operatively coupled to the electronic level sensor and is configured to provide an output correlated with a level measurement provided by the electronic level sensor.

In a second aspect of the invention, an exercise bar comprises a fitness level according to the present invention.

BRIEF DESCRIPTION OF THE DRAWINGS

Those skilled in the art will understand that the drawings described herein are for illustration purposes only. The drawings are not intended to limit the scope of the present disclosure.

Figure 1:
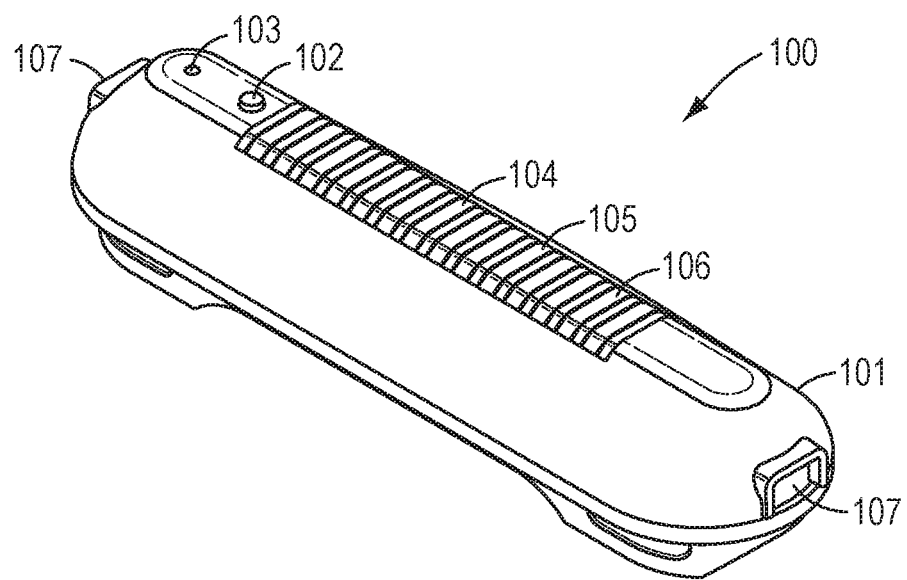
FIG. 1 shows a top perspective view of a fitness level provided by the present disclosure.

Reference is now made to fitness levels according to the present invention. The disclosed embodiments are not intended to be limiting of the claims. To the contrary, the claims are intended to cover all alternatives, modifications, and equivalents.

DETAILED DESCRIPTION

Fitness levels provided by the present disclosure help a user maintain apparatus level. For example, a fitness level can be used to keep an exercise bar level during an exercise regimen.

In an aspect of the present invention, a fitness level comprises a housing; an electronic level sensor disposed within the housing; and an output device retained by the housing, wherein the output device is operatively coupled to the electronic level sensor and is configured to provide an output correlated with a level measurement provided by the electronic level sensor.

A fitness level can include a housing for retaining the various components.

The housing can be any suitable shape and made from any suitable material. For example, it can be desirable that the housing have a relatively low profile so as not to interfere with use of the exercise equipment to which it is attached. A housing can have any suitable dimensions, which can depend in part on the output device.

The housing can be designed to internally retain a power source, circuit board with associated electronics, and readout devices. The housing can be low profile, for example, having a height less than 1 inch, less than 0.75 inches, less than 0.5 inches or less than 0.25 inches. A housing can have a length, for example, within the range from 0.5 to 8 inches, from 0.5 inches to 5 inches, from 0.5 inches to 4 inches, from 0.5 inches to 3 inches, from 0.5 inches to 2 inches, from 0.5 inches to 1.5 inches, or within the range from 0.25 inches to 1 inch. A fitness level can have an overall length less than 8 inches, less than 6 inches, less than 4 inches, or less than two inches. A housing can have a width that is about the same size as or slightly greater than that of an exercise bar such as, for example, from 0.5 to 1.0 inches from 0.5 inches to 1.5 inches, or from 0.5 to 2.0 inches. For example, the housing can have the shape and dimensions of a pen.

The bottom side of the housing can be curved to fit the curvature of an exercise bar. A cushion or cushions can be attached to the underside of the housing to absorb impact, to improve fit to the exercise bar, and/or for aesthetic purposes. The housing can have extension or mounts extending from the underside.

The underside of the housing can include a recess or recesses for retaining one or more magnets.

In embodiments in which a mechanical tilt output is included, a recess for a mechanical transducer such as an impact vibrator can be included.

The housing can be made of any suitable material such as a thermoplastic.

A fitness level can be attached to exercise equipment such as a barbell by any suitable means. The attachment mechanism can be somewhat permanent or can be readily detachable. For example, a semi-permanent attachment can include a clamping arrangement where the housing is attached to opposing blocks using, for example, screws or a snap-lock mechanism; or may be a sleeve that can be fit over the ends of a bar. However, for many users it can be convenient to have a fitness level be readily detachable so that the fitness level can be used with various equipment, or moved from station to station. Examples of easily detachable mechanisms include magnets, straps, and circular clamps.

A fitness level can be attached at any location along a barbell such as toward the center, off center, or toward the ends. When attached toward the center of a barbell, a fitness level can be positioned between where the user grips the barbell. Alternatively, a fitness level can be positioned between where the user grips the barbell and the weight on one side of the barbell. A fitness level can also be positioned between a weight or set of weights on one side of a barbell and the end of the barbell. Some users who want the freedom to grip the barbell at any location between the weights may prefer to position the fitness level toward the end of the barbell outside the weights. Clamping devices such as barbell collars or sleeves may be particularly suitable when a fitness level is positioned toward the ends of a barbell.

In certain embodiments, a fitness level may not incorporate an attachment device. For example, a fitness level can include extensions from the main body that can conform to a barbell and be temporarily attached to a barbell using separate clamps. For example, barbell users are accustomed to loading weights onto the end of a barbell and securing the weights with bar collars. Bar collars can also be used to secure a fitness level to a barbell by clamping onto low profile extensions protruding from the main body of the fitness level.

A fitness level can be attached to an exercise bar in various ways. It can be desirable that the fitness level be easily attached to and removed from an exercise bar. In certain embodiments, an apparatus for attaching the fitness level to the exercise bar can be included in the housing. For example, a fitness level can be attached to an exercise bar using one or more magnets. The one or more magnets can be embedded within slots of the housing and retained by an adhesive, press-fit, or other mechanism. A fitness level can be attached to an exercise bar by a strap that has an end connected to the housing and can be wrapped around an exercise bar and held by a strip of Velcro® located on the other side of the fitness level. Having the attachment apparatus an integral part of the fitness level can facilitate the portability of the device and facilitates its use with a variety of exercise bars.

In certain embodiments, the attachment mechanism is not part of the fitness level. This can be useful when it is desired, for example, to minimize the overall cost of the device. In an example of these embodiments, a fitness level can have plates extending from the ends that can be clamped onto an exercise bar using, for example, bar collars, such as bar collars used to secure detachable weights to a barbell.

The levelness or tilt of exercise equipment can be determined using an electronic level sensor such as accelerometer, a piezoelectric device, an inclinometer, or other suitable level sensor. A level sensor can be a single axis sensor or a dual axis sensor. It is desirable that an electronic sensor be used and that the sensor have a low profile.

When using a barbell, in some exercises a user may be able to see the barbell and in others the barbell or at least certain parts of a barbell may not be easily visible to the user. Furthermore, depending on where the fitness level is attached to the barbell, the fitness level may or may not be easily observed by a user while exercising. Therefore, to accommodate a variety of barbell exercises and fitness level placements, it can be desirable that the tilt measurement be reported to the user in a variety of formats, which can be selected by a user. For example, when the fitness level is positioned in the center of a barbell and between a user's hands such as when performing a bench press or curl, the fitness level can be readily observed by a user and a visual output may be appropriate. In other exercises where a barbell is behind a user's head such as when performing squat exercises, the barbell may not be visible to the user and an audio or mechanical readout may be appropriate. As another example, when the fitness level is attached toward the end of a barbell, the fitness level will also not be easily observable by a user and again, an audio or mechanical readout can be appropriate. The option of having more than one readout mechanism can render the fitness level adaptable to a variety of exercises, attachment locations, and use environments.

The output of the tilt measurement can be visible. A visible output can comprise, for example, a single light, or an array or field of two or more lights. The lights can be configured to communicate the degree of levelness and/or the degree of tilt to a user. For example, when using a single light, the color of the light can be different depending on the degree of tilt. In embodiments in which it is desired that not only the degree of tilt be communicated to a user, but also the direction of tilt, an array of lights or a field of lights can be used as an output to communicate the degree and direction of tilt to a user. For example, in an embodiment comprising an array of lights, a center light can be on when the fitness level detects a level state. When titled, one or more lights on either side of a center light may be lighted to provide a visible indication of the degree and direction of tilting. One or more of the lights may be a different color than at least some of the other lights and may correlate with the degree of tilting. For example, when detecting a level state, one or more of the center lights may emit green, and as the fitness level becomes tilted to one side or the other, the lights on one side of the center lights, such as on the side that is tilting downward, may progressively light and change color, for example from yellow to red. The visual read out can indicate both the direction of tilt and the degree of tilt. Alternatively, a display such as a liquid crystal display may be used to communicate the degree and direction of tilt. In embodiments in which a display is used, not only colors may be used to communicate the desired information, but other features such as arrows or other symbols may be displayed to a user.

For certain exercises and/or positions on the barbell, the fitness sensor may not be easily visible to a user during exercise. In such circumstances, an audio output may be used to communicate the fitness level to a user. For example, an audio output could be silent when the fitness level is in a level state, and can emit an audio signal having an increasing pitch, frequency of beeps, and/or increasing amplitude with progressively increasing tilt.

In certain embodiments, the output can be one or more lights that blink depending on the degree of tilt.

Having an array of lights is useful because it can provide an easy readout of the degree and direction of tilt, which can facilitate the ability of the user to make adjustments while exercising.

Many users are accustomed to wearing headphones and listening to music while exercising. Because an audible output can be distracting to others, a fitness sensor can incorporate a transmitter for communicating tilt measurements to portable devices. For example, a portable device can include a software application that adapts the tilt measurement transmitted by the sensor to a user's portable device and adapted for access according to a user's preferences. An audio signal correlated to the tilt measured by the fitness level can be communicated to user via headphones coupled to the portable device.

While visual and audio outputs may be suitable for certain environments such as a home gym, in other workout environments such as commercial gyms, visual and audio outputs may be distracting to other patrons. It such environments it can be useful that the tilt measurement be communicated by a mechanical output. For example, the tilt measurement can be reported to the user by a vibration transducer that transmits vibrations to the barbell that can be sensed by the users hands. The frequency and/or amplitude of the vibrations can correlate with the degree of tilt.

An audible output is useful during exercises in which the exercise bar is never or not always visible. An audible output is also useful when the fitness level is mounted in a position on the fitness bar that is not easily viewable during use such as when the fitness level is mounted toward an end of an exercise bar.

To communicate a degree of tilt, an audible signal can be activated when the tilt is beyond a certain threshold. The audible signal can have a high tone when the tilt is in one direction and a low tone when the tilt is in the other direction thereby signaling to the user the direction of adjustment to bring the exercise bar level. The degree of tilt can be communicated, for example, by increasing pitch or frequency of beeps, the more out of horizontal alignment the exercise bar is. Other audible signals can be used to communicate tilt misalignment.

The degree of unbalance can also be communicated by vibration. By using this tool it will also balance the degree, angle, repetition and motion that should be performed properly. The fitness level can also download and store information. This fitness level can uneven muscle tone (for weight lifting), enhance physically well-being for the user (sports/recreational activity), promote healthy growth (physical therapy), work performance can be done safely and effectively (occupational aspect) and performance of machinery will run effectively.

A fitness level may also include a mechanism for adjusting the sensitivity of the readout to the degree and direction of tilt. Examples of suitable mechanisms include mechanical mechanisms such as thumb dials or slide bars, and electronic mechanism that can be accessed through a user interface such as a touch screen. A sensitivity adjustment mechanism can be used to control what degree of tilt is communicated to a user and/or the response time of the tilt sensor. The purpose of a sensitivity adjustment is to control the communication of the level sensor measurement in a way that is meaningful to a user. For example, when weightlifting the level of the bar may change continuously during a repetition yet remain more or less level. A user may not necessarily need or want to know every instantaneous deviation from a level condition, but may only need to know excessive deviations, or know deviations the persist for more than a certain period of time. In other words, the sensitivity adjustment can be used to establish an amplitude threshold and/or a temporal threshold, and these thresholds can be established by a user.

In certain embodiments, the sensitivity of the readout can be adjusted by the user. For example, the sensitivity can be adjusted just that tilting within a certain threshold does not cause the readout to change. This feature accounts for differences in user preferences to accommodate users who prefer a very accurate horizontal alignment during training, and other users who are only interested in being alerted to significant deviations from horizontal.

Fitness levels provided by the present disclosure can be used with weight lifting equipment, exercise equipment, sports equipment, physical therapy equipment, occupational therapy equipment, recreational equipment, and machinery.

In physical therapy, although heavy weights may not be employed, many exercises require that the exercise or therapy apparatus be level for best results or provide optimal therapeutic benefit when the apparatus is operated in a level condition. A fitness level may be used in a similar manner as for a weightlifting barbell. For example, a fitness level can be attached to a weighted bar used for exercise or for physical therapy.

An exercise bar includes, for example, weightlifting bars, barbells, and weight bars. Such exercise bars are used, for example, in weight training, aerobic exercise, and physical therapy. For weight lifting, an exercise bar can comprise an elongated rod and one or more weights can be attached at both ends of the bar. Weighted bars are also elongated bars having various weights and are not intended to have additional weights attached.

A fitness level can include one or more additional sub-units such as a power source, such as a rechargeable battery, an activation switch, a sensitivity adjustment unit, a readout selection unit, a wireless transmitter, a wireless receiver, a memory.

The top of the housing can include features such as an on/off button, a sensitivity adjustment mechanism, an output adjustment mechanism, and in certain embodiments, an output mechanism such as an array of lights or a recess for a speaker.

In certain embodiments, a fitness level does not include output devices or can include one or more output devices that can be selectively activated. In certain embodiments, the output devices are not present or are not activated, and the tilt output signal is transmitted via wireless communication to a user's portable device, and the portable device provides the feedback to the user such as by an audio signal.

Within the housing is disposed the electronics for determining tilt and reporting out the tilt measurement to the user. The electronics can be mounted on one or more circuit boards and can include a power source such as a battery, a power control, a microprocessor, one or more output drivers, and one or more tilt sensors. One or more of these electronic components or functions can be integrated. The battery can be rechargeable, in which case the housing and electronics includes a power charging port. The electronics can also include a wireless transmitter, a wireless receiver, and a memory. The fitness level can be configured to communicate with another electronic device such as a personal computer or a portable electronic device such as portable digital assistant.

Features that can be incorporated into a fitness level provided by the present disclosure include a digital display screen such a liquid crystal display, multiple display screens, multiple display modes such as outputs in degrees, percent, distance, and/or fractions, a degree to angle converter, a clock, a timer, a camera, voice activation, a repetition sensor for counting the number of repetitions, a level tracker to count the number of times a user tilts the fitness level to the left and/or to the right, an altimeter to monitor elevation, and/or memory. A fitness level can include a rechargeable battery and an interconnection port for recharging the battery. A fitness level can include a mechanism for automatically switching to sleep mode to save the battery power when the fitness level is inadvertently left on for a period of time.

The output of the level measurement device such as an accelerometer can be stored in a memory. The data representing off balanced/unleveled activity can be recorded and stored which can be later viewed and assessed to see progress. The data can be stored in a memory incorporated into the housing of the apparatus and/or a memory can be external to the apparatus and the data obtained from the level sensor can be transmitted to remote device such as a portable device or a computer.

A fitness level can include led lights, magnets, Velcro, clip on features, resistors, a triple axis accelerometer, jumper wires, springs, electronics, memories, processors, break-away headers, reflective material, wireless transmitters, blue tooth, wi-fi, speakers, or combinations of any of the foregoing.

A fitness level can include, for example, light ports, speakers, a vibration indicator, grips, a switch, such as a three-way switch, Bluetooth capability, USB connections, ear phone jacks, light indicators, automatic shutoff, time measurement and displays, heart rate monitors and displays, accelerometers, counting measurement, distance measurements, center lights, battery case for components inside, energy source varies (solar or powered by kinetic energy), on and off button, button/programmable for changes of degree of motion, and indication of low battery life.

Other features that can be incorporated into the fitness level include, for example, a digital display screen that can include a user interface, multiple display modes for communicating tilt such as degrees, percent, feet, or inches, a degree to angle converter, a clock, a camera, voice activation, ability to customize sound output, pitch and sound control, multiple audio tones for notifications, a laser beam to check for constancy, vibration alerts, a wall or surface grip, a repetition sensor or counter, a counter to track the number of times the level is tilted to the left or right, a freezable display, a water and shock resistant assembly, a pressure sensor, a sensor for determining oxygen concentration, a monitor for determining heart rate, body temperature, and a pulse rate.

For physical therapy or medical rehabilitation applications a fitness level can include a pressure sensor such as a MEMS pressure sensor, which can be used to measure the vertical motion of the fitness level and apparatus on which it is mounted. A fitness level can include vibration alerts, voice activation, devices for monitoring body temperature and heart rate, and/or a camera.

FIG. 1 shows a perspective view of a fitness level 100. The design is for illustration purposes only and it can be appreciated that other designs, dimensions and lighting configurations can be used. The fitness level includes housing 101, activation switch 102, operating light 103, and array of lights 104/105/106. Activation switch 102 can be used to activate and deactivate the fitness level. Operating light 103 indicates when the fitness level is operational, which can be useful when an audible output is used. Recesses 107 can include I/O ports such as a USB connection or connection for recharging a battery. An activation switch or switches can also be disposed within recesses 107.

Array of lights 104/105/106 includes blue lights 104, yellow lights 105. and red lights 106, which are used to communicate to the user the degree and direction of tilt. Under certain conditions only one light, a few lights, or less than all lights will be on at a given time and will be configured to correspond to the direction and degree of tilt.

For a level condition, blue lights 104 will be on; for a small tilt yellow light(s) 105 on one side of the blue lights will be on depending on the direction of tilt, and for large tilt angles red light(s) 106 will be on. Other colors may be used and different amplitudes may be used.

Figure 2:
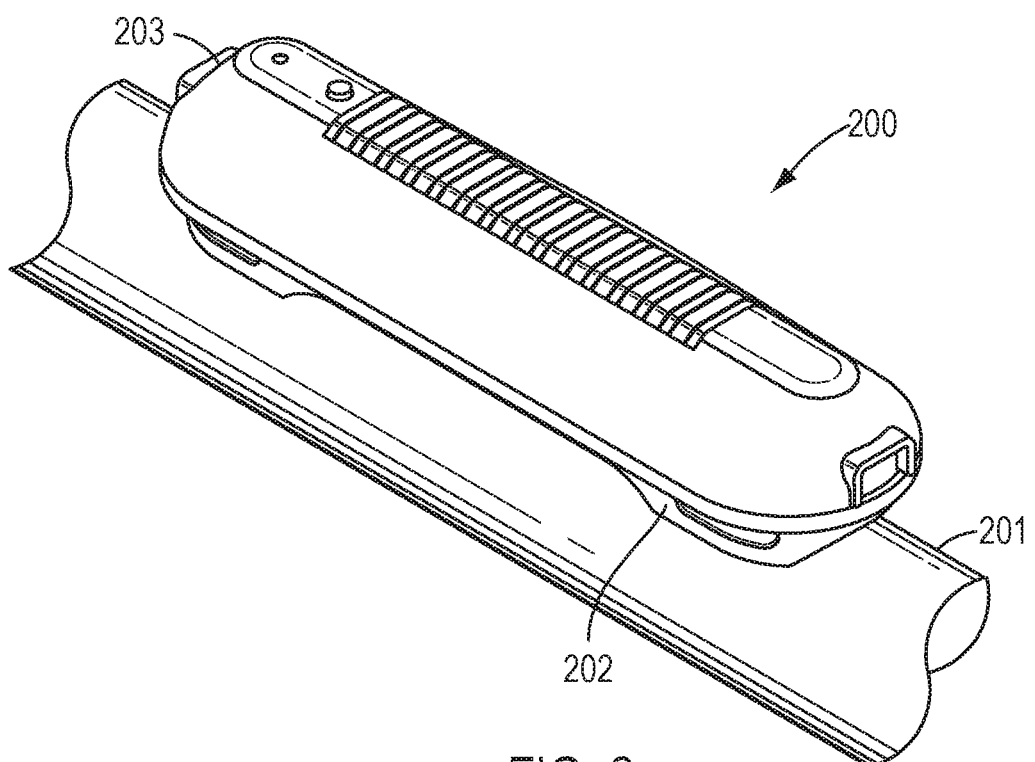
FIG. 2 shows a top perspective view of a fitness level provided by the present disclosure mounted on a bar.

FIG. 2 shows a perspective view of a fitness level 200 mounted on a rod 201 such as a weightlifting bar. The mounting base 202 is shaped to have a surface that conforms to the diameter of the rod. The fitness level can affix to the bar by means of a magnet retained within housing 203. Other attachment mechanisms such as such or straps.

Figure 3:
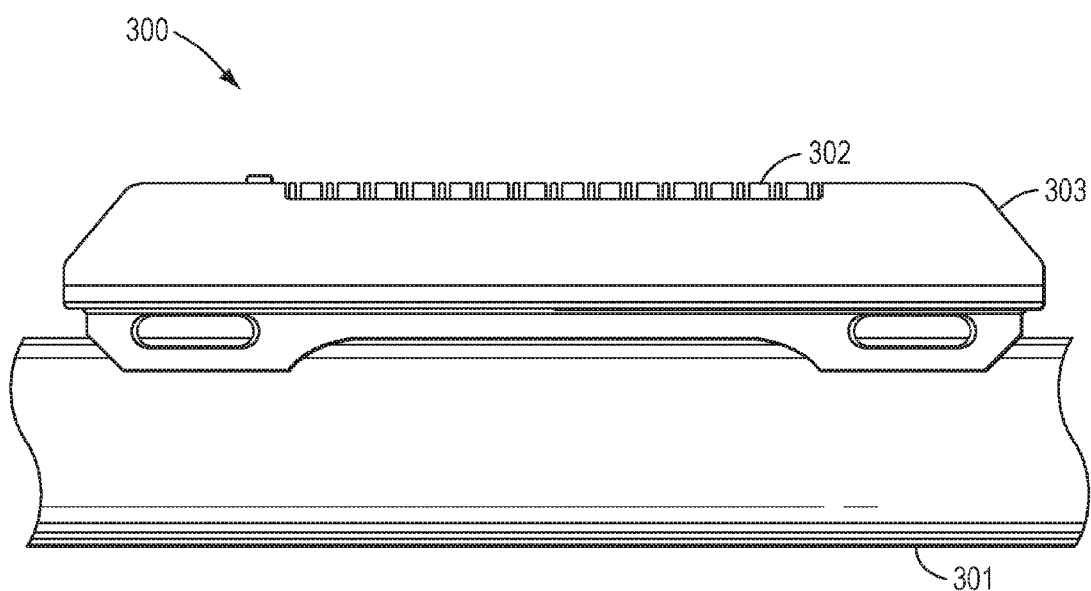
FIG. 3 shows a side view of a fitness level provided by the present disclosure mounted on a bar.

FIG. 3 shows a side view of a fitness level 300 mounted to bar 301. In can be appreciated that the configuration of lights 302 can be different. For example, rather than discrete, lights 302 can be continuous. The lights can be provided by light emitting diodes (LED) emitting different colors, or the LEDs can provide white light with the different colors being provided by filters or tinted plastic. The lights 302 can be situated at the top of the fitness level housing 303 as shown in FIG. 3 or can extend around the sides or a portion of the sides of the housing to provide enhanced viewing angle.

Figure 4:
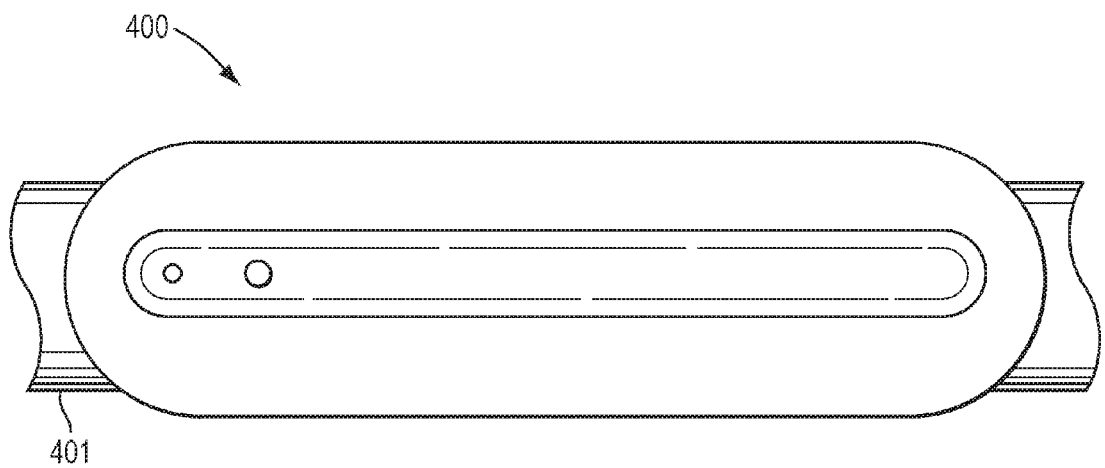
FIG. 4 shows a top view of a fitness level provided by the present disclosure mounted on a bar.

FIG. 4 shows a top view of fitness level 400 mounted on bar 401.

Figure 5:
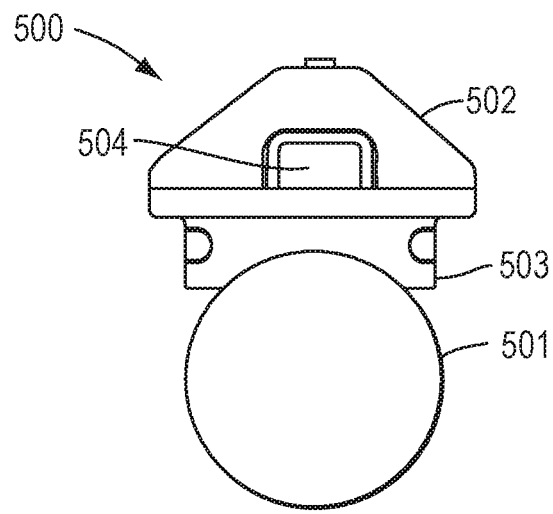
FIG. 5 shows an end view of a fitness level provided by the present disclosure mounted on a bar.

FIG. 5 shows a side view of fitness level 500 mounted on bar 501. In this embodiment, the housing has about the same height and width as the bar 501, although it can be appreciated that other dimensions can be used. As is apparent in the side view, the mounting features 503 conform to the curvature of the bar 501. The fitness level includes recess 504 that can retain, for example, one or more I/O ports and/or activations switches for turning the fitness level on and off, for changing measurement modes, and/or for changing output modes.

Figure 6:
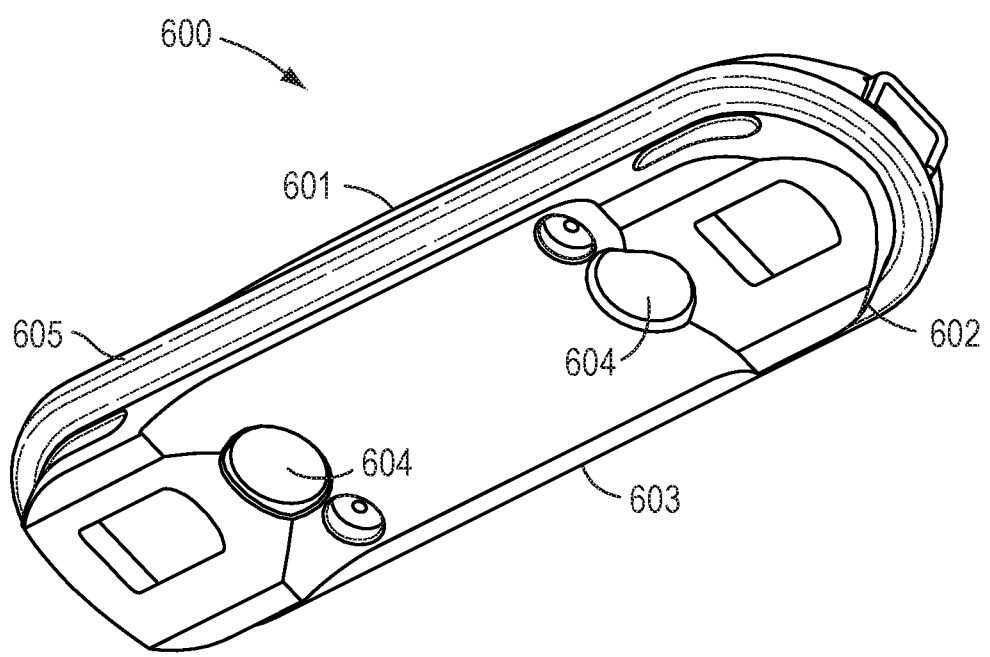
FIG. 6 shows a bottom perspective view of a fitness level provided by the present disclosure.

FIG. 6 shows a bottom view of fitness level 600. Mounting structures 602 are disposed on the underside of housing 601. The mounting structures 602 are extend below or stand off from the underside 603 of housing 601. In part this provide a more or less two points for contacting the fitness level housing 600 to a bar (now shown) by means of mounting structures 602. Magnets 604 are disposed within recesses in the housing 601 and standoff from direct contact with an exercise bar. The standoff can facilitate removal of the fitness level from a bar. The overhang 605 around the perimeter of the housing 601 can provide a gripping point to facilitate detaching the fitness level from an exercise bar. Other gripping configurations can be used.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A fitness level for use with an exercise bar, comprising:
   a housing;
   an electronic level sensor disposed within the housing; and
   an output device retained by the housing, wherein,
   the output device is operatively coupled to the electronic level sensor and is configured to provide an output correlated with a level measurement provided by the electronic level sensor;
   the output device comprises a linear array of lights visible on a surface of the housing, wherein the linear array of lights comprises a first plurality of lights to the left of a center of the linear array of lights, and a second plurality of lights to the right of the center of the linear array of lights; and
   one or more features configured to attach the fitness level to an exercise bar.

2. The fitness level of claim 1, wherein the electronic level sensor comprises an accelerometer.

3. The fitness level of claim 1, wherein at least some of the lights of the linear array of lights have different colors.

4. The fitness level of claim 1, wherein at least some of the lights of the linear array of lights are configured to illuminate in response to a direction of tilt and a degree of tilt.

5. The fitness level of claim 1, wherein the output comprises an audio output.

6. The fitness level of claim 5, wherein the audio output is configured to communicate a direction of tilt, a degree of tilt, or a combination thereof, to a user.

7. The fitness level of claim 1, wherein the linear array of lights comprises a liquid crystal display.

8. The fitness level of claim 1, wherein the one or more features configured to attach the fitness level comprises a magnet, a strap, or an extension.

9. The fitness level of claim 1, comprising a mechanism for adjusting a sensitivity of the output to the level measurement.

10. An exercise bar comprising the fitness level of claim 1.

11. The exercise bar of claim 10, wherein the exercise bar is selected from a weightlifting bar, a barbell, and a weight bar.

12. The fitness level of claim 1, wherein the linear array of lights is configured to communicate a degree of tilt, a direction of tilt, or a combination thereof, to a user.

13. The fitness level of claim 1, wherein,
   lights of the first plurality of lights are configured to progressively illuminate away from the center with increasing degree of tilt; and
   lights of the second plurality of lights are configured to progressively illuminate away from the center with increasing degree of tilt.

14. The fitness level of claim 1, wherein the housing comprises an elongated body.

15. The fitness level of claim 1, wherein the housing comprises a mounting base shaped to conform to a curvature of the exercise bar.

16. The fitness level of claim 1, wherein the linear array of lights comprises a plurality of light emitting diodes.

17. A fitness level, comprising:
   a housing, wherein the housing comprises an elongated body and a mounting base shaped to conform to a curvature of an exercise bar;
   one or more magnets disposed in the mounting base and configured to detachably secure the housing to the exercise bar;
   an electronic level sensor disposed within the housing; and
   an output device retained by the housing and visible on a surface of the housing,
   wherein the output device is operatively coupled to the electronic level sensor and is configured to provide an output correlated with a level measurement provided by the electronic level sensor;
   wherein the output device comprises a linear array of lights, wherein the linear array of lights comprises a first plurality of lights to the left of a center of the linear array of lights, and a second plurality of lights to the right of the center of the linear array of lights; and wherein the plurality of lights is configured to progressively illuminate away from the center of the linear array of lights with increasing degree of tilt.

18. The fitness level of claim 17, wherein the exercise bar is selected from a weightlifting bar, a barbell, and a weight bar.

19. The fitness level of claim 1, wherein the output comprises vibration.

20. The fitness level of claim 19, wherein the vibration is configured to communicate a direction of tilt, a degree of tilt, or a combination thereof, to a user.

21. The fitness level of claim 19, wherein a vibration frequency, a vibration amplitude, or both a vibration frequency and vibration amplitude are correlated with the tilt angle.

22. The fitness level of claim 1, wherein the output device comprises a vibration transducer configured to transmit vibrations to the exercise bar capable of being sensed by the user.

23. The fitness level of claim 5, wherein an audio tone, an audio pitch, an audio frequency, an audio amplitude, or a combination thereof are correlated with the tilt angle.

24. An exercise apparatus comprising:
   an exercise bar; and
   the fitness level of claim 1 secured to the exercise bar.

25. The exercise apparatus of claim 24, wherein the fitness level is detachably secured to the exercise bar.

26. The exercise apparatus of claim 24, wherein the exercise bar is selected from a weightlifting bar, a barbell, and a weight bar.

* * * * *